(12) United States Patent
Tsai

(10) Patent No.: US 12,375,146 B2
(45) Date of Patent: Jul. 29, 2025

(54) CSI ACQUISITION FOR DISTRIBUTED MIMO

(71) Applicant: Mediatek Inc., Hsinchu (TW)

(72) Inventor: Lung-Sheng Tsai, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 278 days.

(21) Appl. No.: 17/944,289

(22) Filed: Sep. 14, 2022

(65) Prior Publication Data

US 2023/0111205 A1    Apr. 13, 2023

Related U.S. Application Data

(60) Provisional application No. 63/253,574, filed on Oct. 8, 2021.

(51) Int. Cl.
*H04B 7/06* (2006.01)
*H04J 11/00* (2006.01)

(52) U.S. Cl.
CPC ......... *H04B 7/0626* (2013.01); *H04B 7/0639* (2013.01); *H04J 11/0053* (2013.01); *H04B 7/0632* (2013.01)

(58) Field of Classification Search
None
See application file for complete search history.

(56) References Cited

U.S. PATENT DOCUMENTS

| | | | | |
|---|---|---|---|---|
| 2011/0063989 | A1* | 3/2011 | Yang | H04B 7/022 370/332 |
| 2014/0050212 | A1* | 2/2014 | Braz | H04B 1/005 370/343 |

(Continued)

FOREIGN PATENT DOCUMENTS

| | | |
|---|---|---|
| CN | 105471568 A | 4/2016 |
| CN | 111464259 A | 7/2020 |

(Continued)

OTHER PUBLICATIONS

"Antenna Clustering for Simultaneous Wireless Information and Power Transfer in a MIMO Full-Duplex System: A Deep Reinforcement Learning-based Design" by Yasser Al-Eryani and Ekram Hossain. IEEE Transactions on Communications, vol. 69, No. 4; Apr. 2021. pp. 2331 to 2345. (Year: 2021).*

(Continued)

*Primary Examiner* — Xavier S Wong
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. The UE determines that reference signals are transmitted from L antenna ports of a base station on reference time-frequency resources. The UE receives first RF signals at $N_{r1}$ physical antennas on first time-frequency resources. The first RF signals carries the reference signals. $N_{r1}$ and L are positive integers. $N_{r1}$ is less than L. The UE receives second RF signals at $N_{r2}$ physical antennas on second time-frequency resources. The second RF signals carries the reference signals. $N_{r2}$ is a positive integer and less than L. The UE obtains channel state measurements corresponding to the reference signals based on baseband signals derived from the first RF signals and the second RF signals. The UE generates a CSI report based on the channel state measurements.

20 Claims, 10 Drawing Sheets

(56) References Cited

U.S. PATENT DOCUMENTS

| | | | |
|---|---|---|---|
| 2019/0115996 A1* | 4/2019 | Wu | H04L 1/0003 |
| 2019/0261342 A1* | 8/2019 | Zhang | H04W 72/046 |
| 2020/0228267 A1 | 7/2020 | Park et al. | |
| 2023/0224885 A1* | 7/2023 | Zhang | H04B 7/0413 |
| | | | 370/329 |

FOREIGN PATENT DOCUMENTS

| | | |
|---|---|---|
| CN | 111801917 A | 10/2020 |
| KR | 20160092868 A | 8/2016 |
| KR | 20160092869 A | 8/2016 |

OTHER PUBLICATIONS

Taiwan Patent Office, "Office Action", Jan. 11, 2023, Taiwan.
China Patent Office, "Office Action", Mar. 6, 2025, China.

\* cited by examiner

CSI ACQUISITION FOR DISTRIBUTED MIMO

CROSS-REFERENCE TO RELATED APPLICATION(S)

This application claims the benefits of U.S. Provisional Application Ser. No. 63/253,574, entitled "CSI ACQUISITION FOR DISTRIBUTED MIMO TRANSCEIVERS" and filed on Oct. 8, 2021, which is expressly incorporated by reference herein in their entirety.

BACKGROUND

Field

The present disclosure relates generally to communication systems, and more particularly, to techniques of forming distributed multiple-input multiple-output MIMO transmitters/receivers.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines that reference signals are transmitted from L antenna ports of a base station on reference time-frequency resources. The UE receives first RF signals at $N_{r1}$ physical antennas on first time-frequency resources. The first RF signals carries the reference signals. $N_{r1}$ and L are positive integers. $N_{r1}$ is less than L. The UE receives second RF signals at $N_{r2}$ physical antennas on second time-frequency resources. The second RF signals carries the reference signals. $N_{r2}$ is a positive integer and less than L. The UE obtains channel state measurements corresponding to the reference signals based on baseband signals derived from the first RF signals and the second RF signals. The UE generates a CSI report based on the channel state measurements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
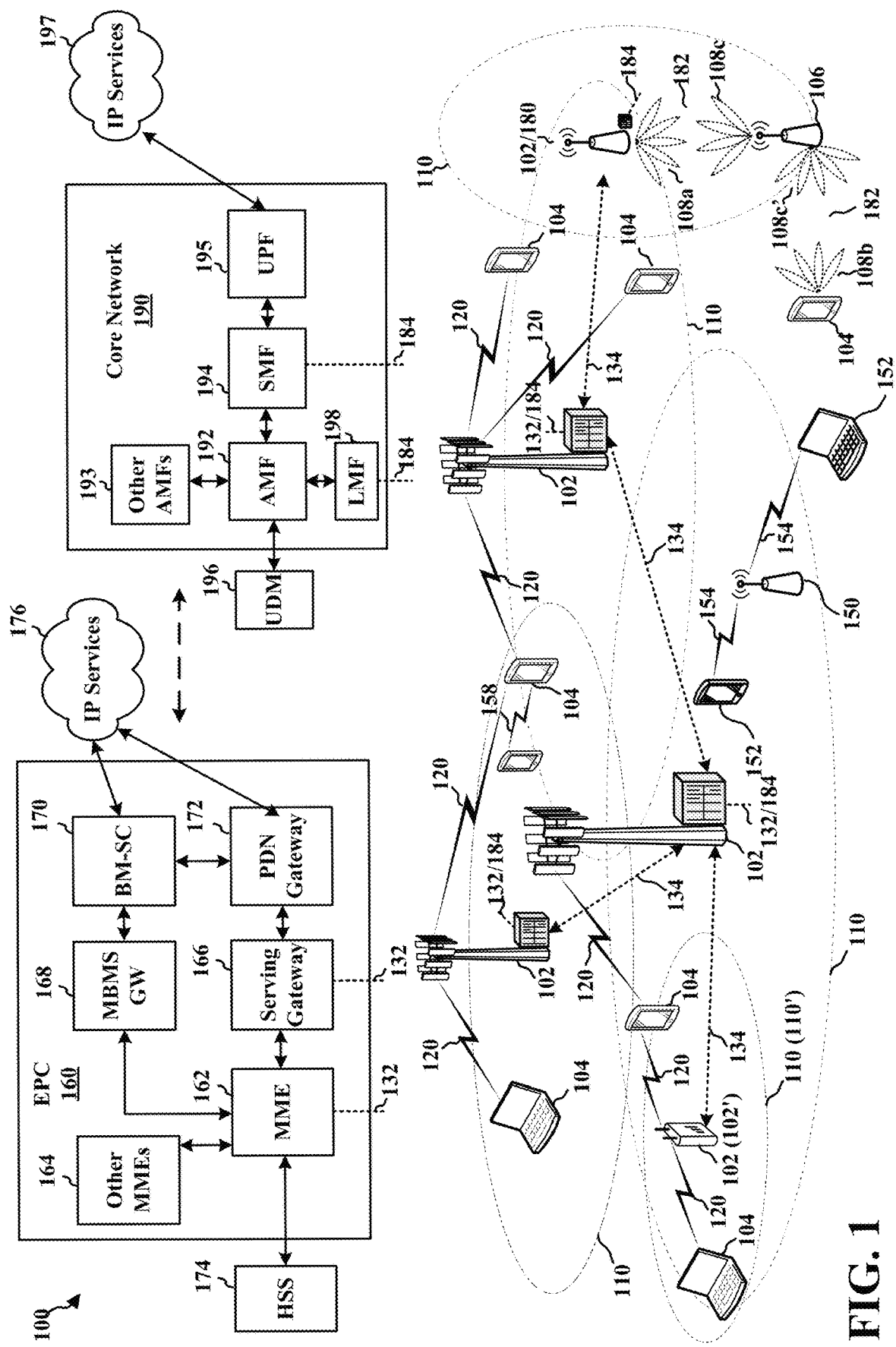
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to X MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
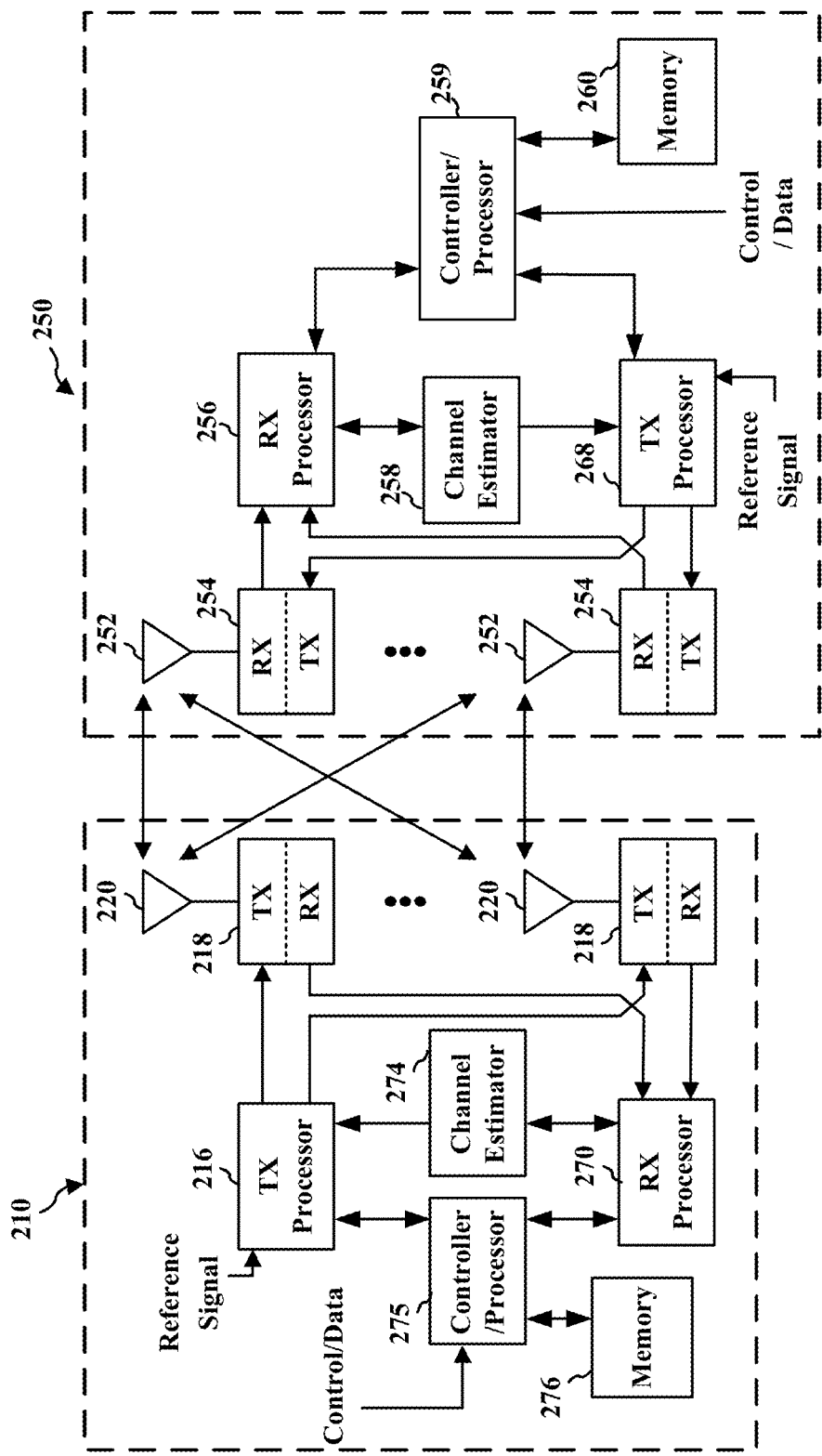
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
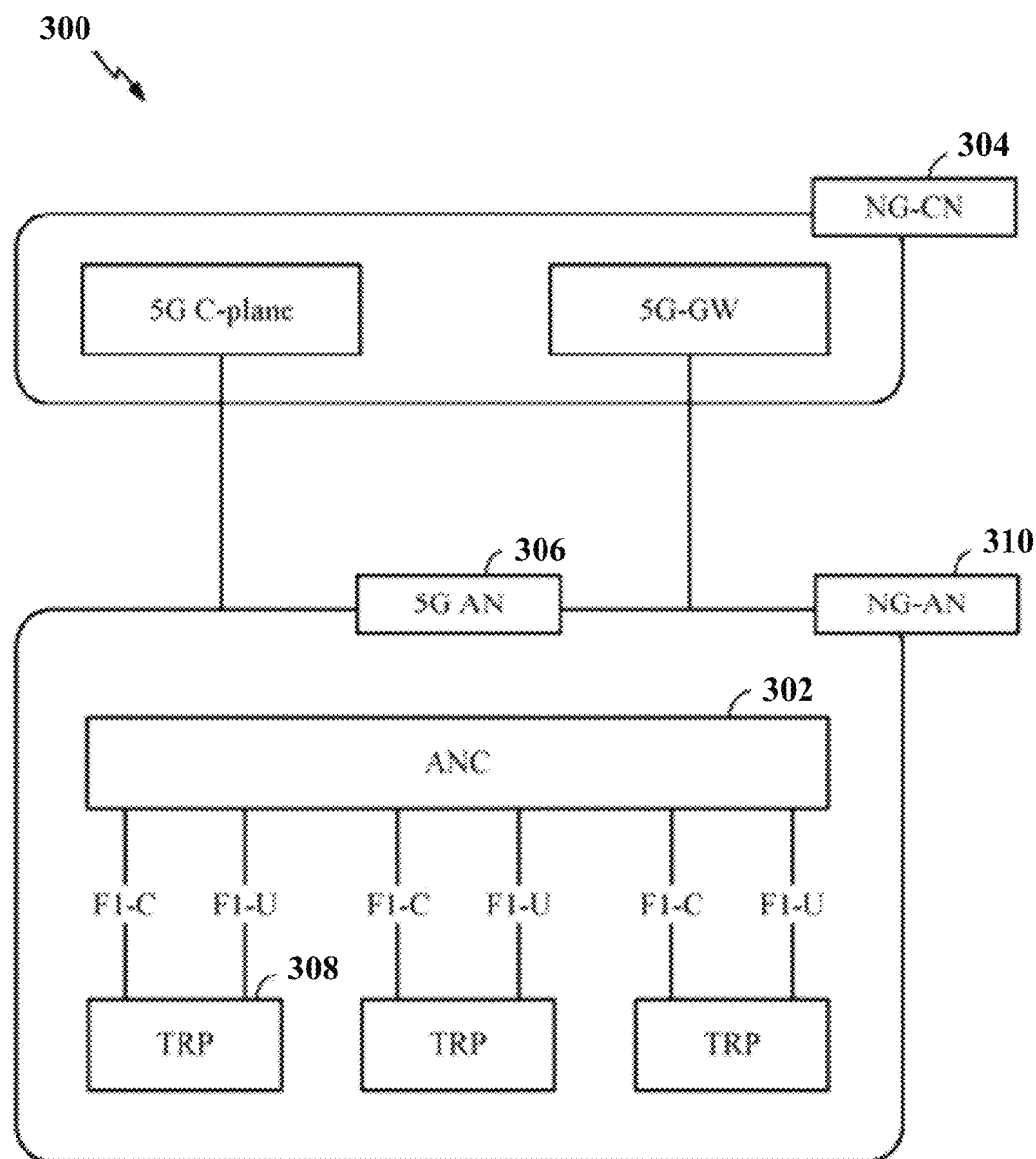
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
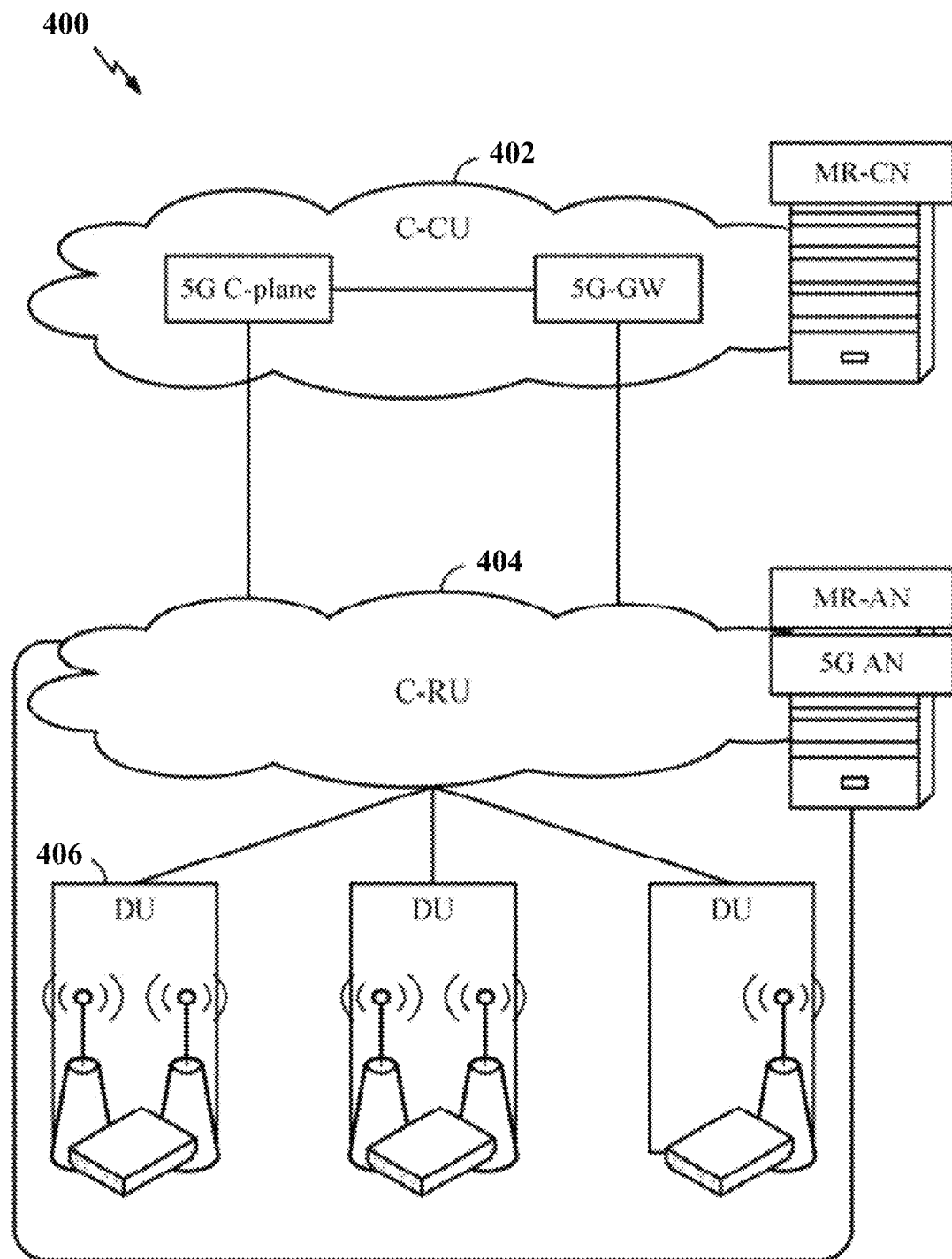
FIG. 4 illustrates an example physical architecture of a distributed access network.

FIG. 4 illustrates an example physical architecture of a distributed RAN 400, according to aspects of the present disclosure. A centralized core network unit (C-CU) CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
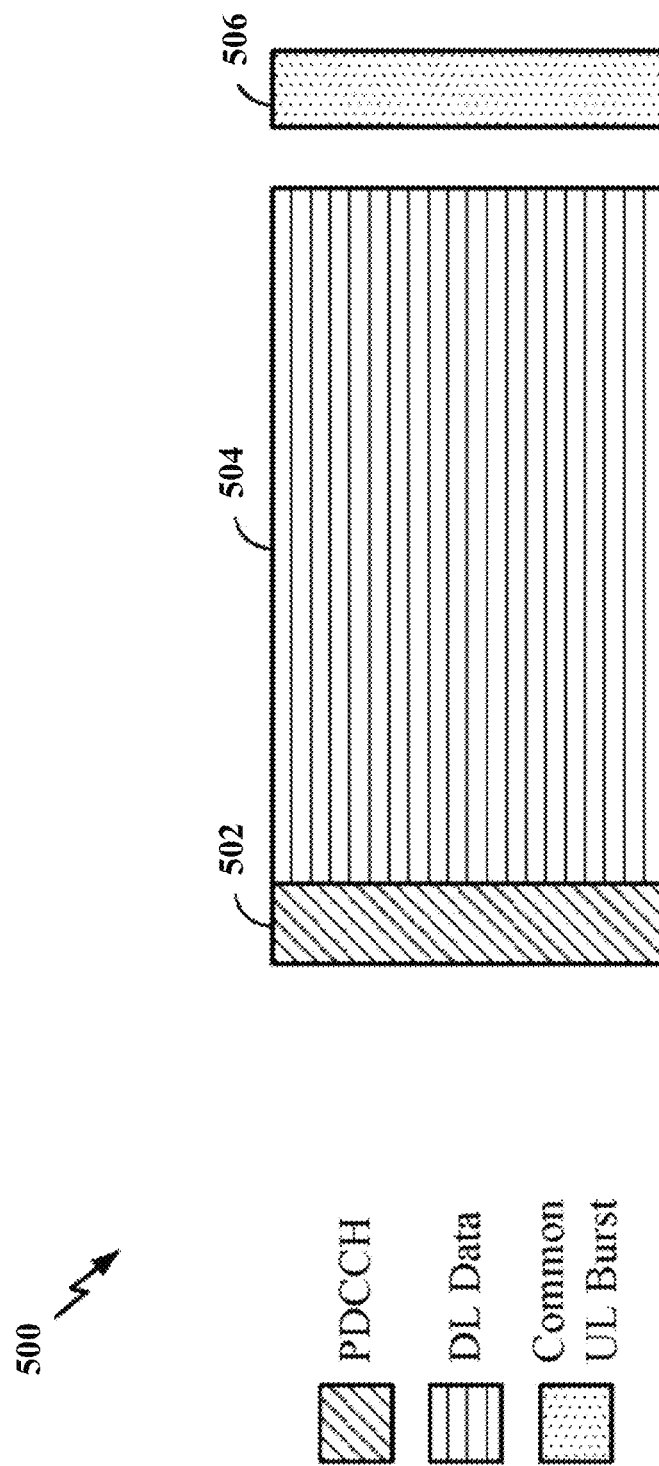
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
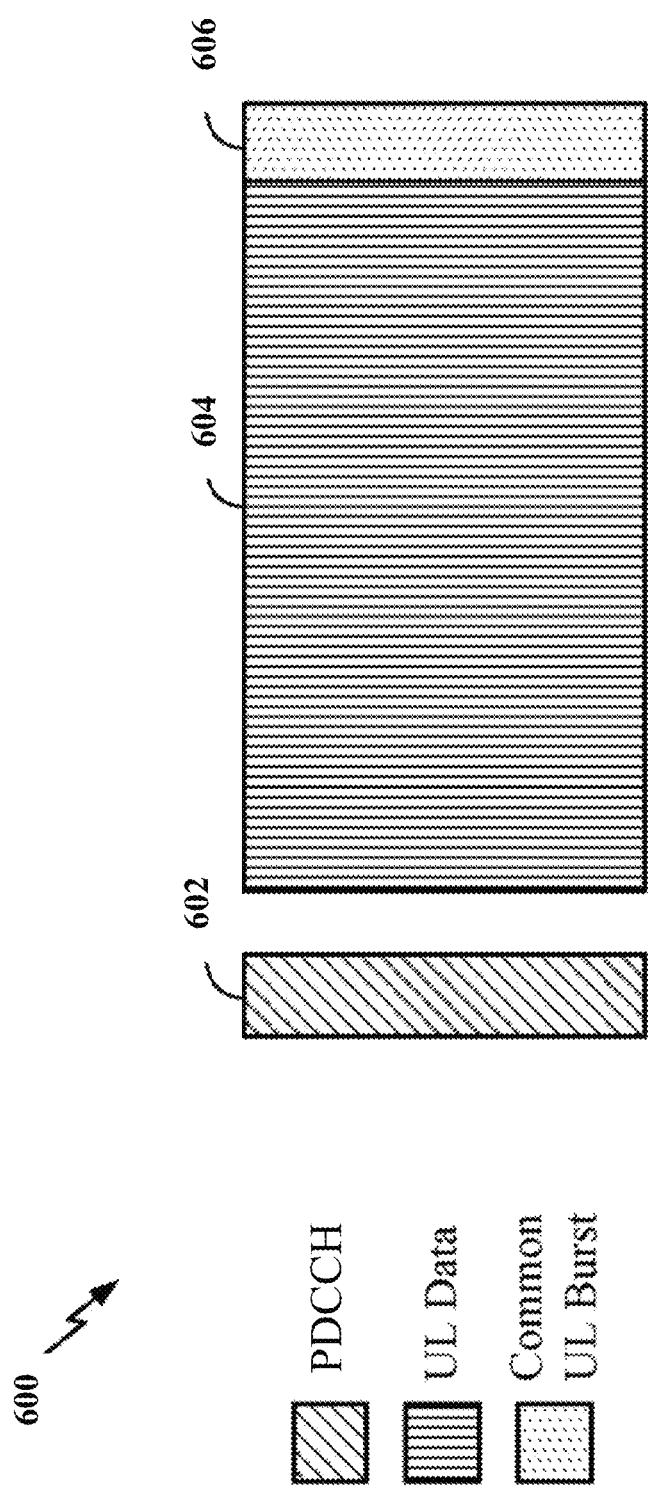
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
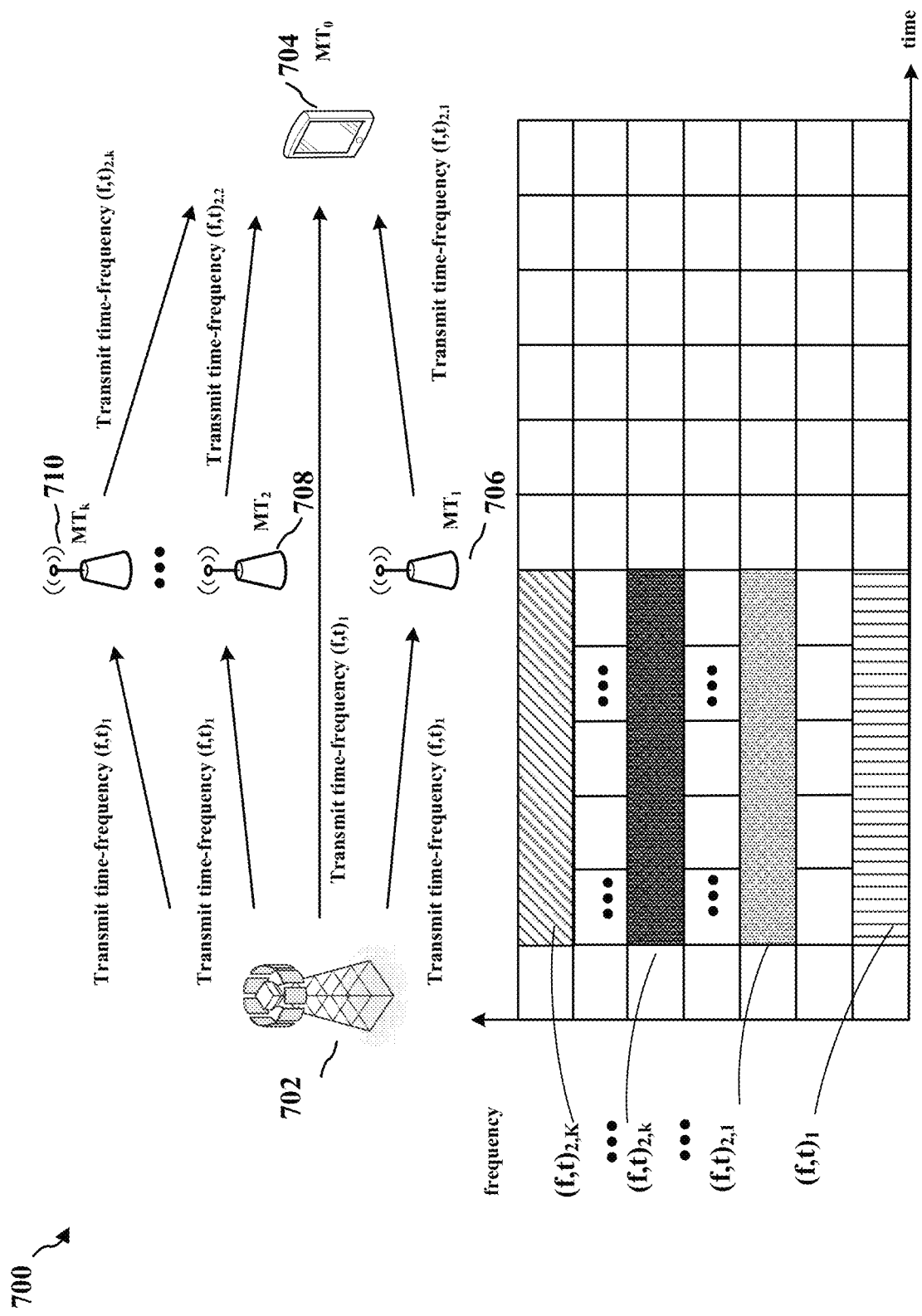
FIG. 7 is a diagram illustrating distributed MIMO transmission.

FIG. 7 is a diagram 700 illustrating distributed MIMO transmission. The present disclosure shows that multiple distributed low-rank mobile terminals (MTs), fixed customer premise equipment (CPE), or wireless devices can form a high-rank MIMO transmitter/receiver. A base station 802 and a master MT 704 communicate with each other via one or more slave MTs 706, 708 . . . 710. The slave MTs are also referred to as repeaters, and may be wireless devices such as mobile phones and wireless routers. In this example, there are K slave MTs (K is an integer and K≥1). The master MT 704 and the K slave MTs 706, 708, . . . 710 are connected together to form a high-rank MIMO transmitter/receiver network to expand the channel rank. The term "mobile terminal" is used here to refer to any type of wireless device, including a fixed wireless device such as CPE.

As described infra, a repeater receives RF signals on a first frequency band, shifts the RF carrier of the RF signals to a second frequency band, and then transmits the shifted RF signals on the second frequency band. Each frequency band is an interval in frequency domain. In particular, the repeater may be a frequency translating repeater. The repeater may also be a time delaying repeater, which receive RF signals and then re-transmit the received RF signals after some time delay. Further, the repeater may receive RF signals in a first time-frequency resource, translate the received RF signals to a second time-frequency resource, and then transmit the translated RF signals. In particular, the first time-frequency resource may be orthogonal with the second time-frequency resource.

This disclosure uses (f, t) to denote the time-frequency resources: $(f, t)_1$ denotes the time-frequency resource used by the base station for transmitting and receiving RF signals. $(f, t)_{2,k}$ denotes the resources used by a particular repeater $MT_k$ (k is an integer and 1≤k≤K) to transmit RF signals to the master MT 704. Accordingly, $(f, f)_{2,1}$ indicates the resources used by the master MT 704 (i.e., $MT_0$) to receive RF signals from the repeater 706 (i.e., $MT_1$); $(f, t)_{2,2}$ indicates the resources used by the master MT 704 to receive signals from the repeater 708 (i.e., $MT_2$), and so on. In certain configurations, $(f, t)_1, (f, t)_{2,1}, (f, t)_{2,2}, \ldots$ and $(f, t)_{2,K}$ are orthogonal. In particular, they do not overlap in frequency domain. In certain configurations, $(f, t)_1$ may be the same as one $(f, t)_{2,k}$ (k∈1, . . . K), while the rest are orthogonal to each other. Further, $(f, t)_1$ and $(f, t)_{2,k}$ (1≤k≤K) can be non-overlapped component carriers, non-overlapped bandwidth parts (BWPs), non-overlapped frequency bands, or non-overlapped collections within the same component carrier.

Figure 8:
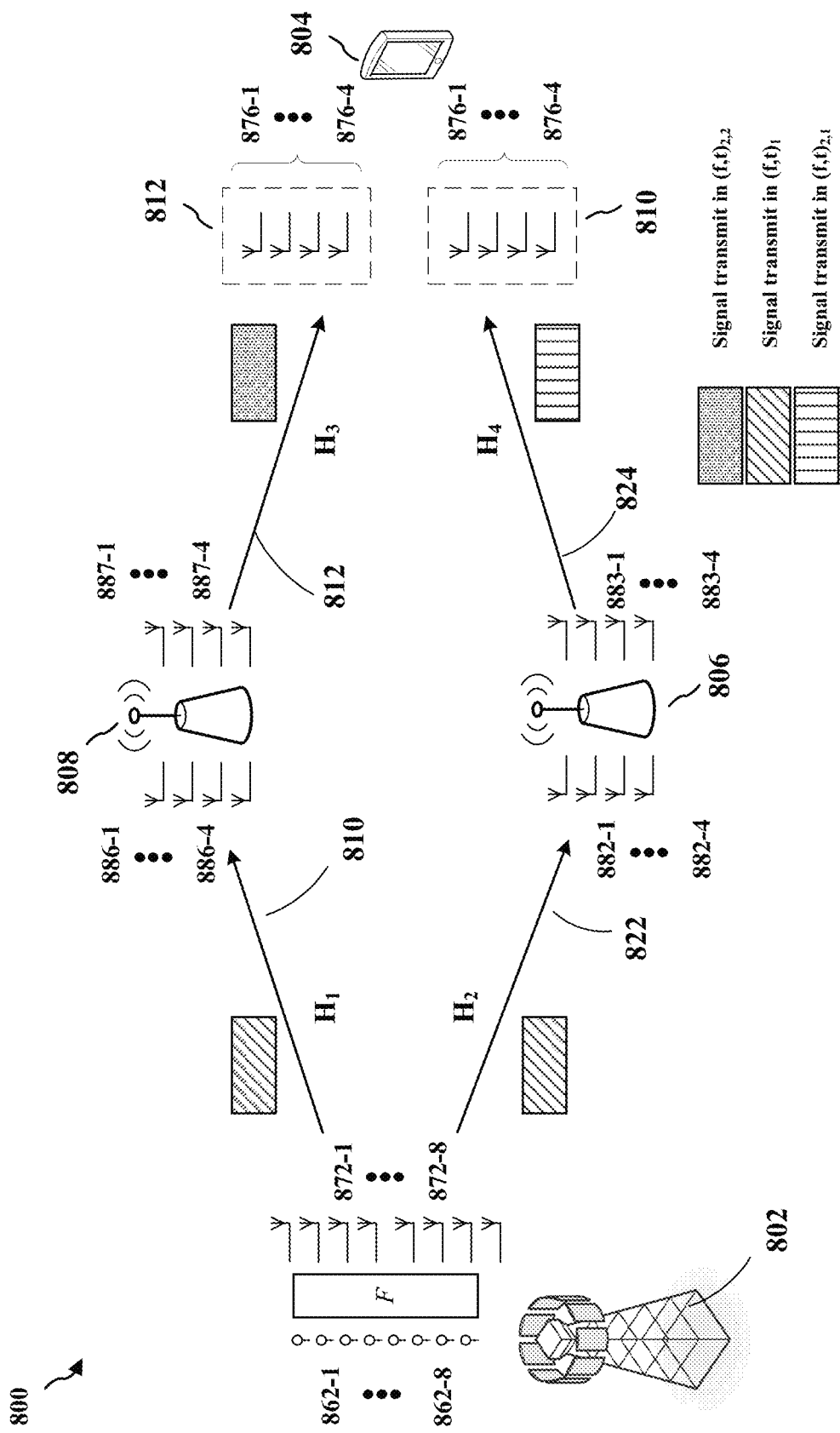
FIG. 8 is a diagram illustrating distributed MIMO CSI Acquisition.

FIG. 8 is diagram 8000 illustrating distributed MIMO CSI Acquisition. In this example, a base station 802 have 8 physical antennas 872-1 to 872-8. Further, the base station 802 has 8 antenna ports 862-1 to 862-8.

A UE 804 has 4 physical antennas 876-1 to 876-4, which can receive signals simultaneously on time-frequency resources $(f, t)_{2,1}$ and $(f, t)_{2,2}$. Further, the 4 receiving physical antennas 876-1 to 876-4 receiving on $(f, t)_{2,1}$ are considered as a first group of physical antennas 810 and the same 4 physical antennas receiving on $(f, t)_{2,2}$ are considered as a second group of physical antennas 812. That is, the first group of physical antennas 810 and the second group of physical antennas 812 receive signals on different frequency resources. In this example, the same physical antennas are shared on $(f, t)_{2,1}$ and $(f, t)_{2,2}$ to reduce chip area cost of the UE 804. In other examples, the UE 804 is equipped with different physical antennas on $(f, t)_{2,1}$ and $(f, t)_{2,2}$.

A repeater 806 and a repeater 808 are placed between the base station 802 and the UE 804. The repeater 806 has 4 transmitting physical antennas 883-1 to 883-4 and 4 receiving physical antennas 882-1 to 882-4. The repeater 808 has 4 transmitting physical antennas 887-1 to 887-4 and 4 receiving physical antennas 886-1 to 886-4.

In this example, the base station 802 transmits and receives signals on reference time-frequency resources $(f, t)_1$. The repeater 806 receives signals on $(f, t)_1$, translates the signals (e.g., frequency shift), and retransmits the signals on first time-frequency resources $(f, t)_{2,1}$. The repeater 808 receives signals on $(f, t)_1$, translates the signals (e.g., frequency shift), and retransmits the signals on second time-frequency resources $(f, t)_{2,2}$.

Further, each of the 8 antenna ports 862-1 to 862-8 of the base station 802 can send CSI-RSs on a respective CSI-RS resource set. The CSI-RSs sent from the 8 antenna ports 862-1 to 862-8 can be represented by a vector:

$$X_{8\times 1} = \begin{bmatrix} x_1 \\ x_2 \\ \ldots \\ x_8 \end{bmatrix}.$$

i is an integer and $1 \leq i \leq 8$. The $X_{8 \times 1}$ is then mapped to the 8 physical antennas 872-1 to 872-8 by a spatial filter F. As such, the baseband signals to be transmitted at the 8 physical antennas 872-1 to 872-8 are $F \cdot X_{8 \times 1}$.

The base station 802 mix the $F \cdot X_{8 \times 1}$ with RF carriers in time-frequency resources $(f, t)_1$ to generated RF signals, and transmits the resulting RF signals at the 8 physical antennas 872-1 to 872-8.

Further, in this example, the repeater 808 has 4 receiving physical antennas 886-1 to 886-4. The 4 receiving physical antennas 886-1 to 886-4 receive the RF signals transmitted from the base station 802 on the time-frequency resources $(f, t)_1$ through a channel 810, which can be represented as $H_{1_{4 \times 8}}$. At the repeater 808, the baseband signals, if extracted from the RF signals received at the antennas of 708, can be represented as: $H_{1_{4 \times 8}} \cdot F \cdot X_{8 \times 1}$. The repeater 808 can amplify and forward the RF signals received. The impact, of the amplification and forwarding, to the baseband signals can be represented as $G_{s_{4 \times 4}}^1$. Further, the repeater 808 converts resources of the RF carrier to time-frequency resources $(f, t)_{2,2}$. The impact of the conversion to the baseband signals can be represented as $T_1$. The repeater 808 transmits RF signals on the frequency band $(f, t)_{2,2}$ at the 4 transmitting physical antennas 887-1 to 887-4. As such, the RF signals transmitted by the repeater 808 carries the baseband signals $$T_1 \cdot G_{s_{4 \times 4}}^1 \cdot H_{1_{4 \times 8}} \cdot F \cdot X_{8 \times 1}$$

Further, the second group of physical antennas 812 of the UE 804 receive, on the time-frequency resources $(f, t)_{2,2}$, the RF signals transmitted from the repeater 808 through the channel 812, which can be represented as $H_{3_{4 \times 4}}$. The UE 804 obtains baseband signals from the RF signals on the frequency band $(f, t)_{2,2}$:

$$R_{1_{4 \times 1}} = H_{3_{4 \times 4}} \cdot T_1 \cdot G_{s_{4 \times 4}}^1 \cdot H_{1_{4 \times 8}} \cdot F \cdot X_{8 \times 1}$$

Further, the repeater 806 receives the RF signals transmitted from the base station 802 on the time-frequency resources $(f, t)_1$ through a channel 822, which can be represented as $H_{2_{4 \times 8}}$. The baseband signals received at the repeater 806 can be represented as: $H_{2_{4 \times 8}} \cdot F \cdot X_{8 \times 1}$. The repeater 806 amplify and forward the RF signals received, the impact to the baseband signals can be represented as $G_{s_{4 \times 4}}^2$. Further, the repeater 806 converts the resources the RF carrier to time-frequency resources $(f, t)_{2,1}$. The impact of the conversion to the baseband signals can be represented as $T_2$. The repeater 806 transmits RF signals on the time-frequency resources $(f, t)_{2,1}$ at 4 transmitting physical antennas 883-1 to 883-4. As such, the RF signals transmitted by the repeater 806 carries the baseband signals $$T_2 \cdot G_{s_{4 \times 4}}^2 \cdot H_{2_{4 \times 8}} \cdot F \cdot X_{8 \times 1}$$

Further, the first group of physical antennas 810 of the UE 804 receive, on the frequency band $(f, t)_{2,1}$, the RF signals transmitted from the repeater 806 through a channel 824, which can be represented as $H_{4_{4 \times 4}}$. The UE 804 obtains baseband signals from the RF signals on the frequency band $(f, t)_{2,1}$:

$$R_{2_{4 \times 1}} = H_{4_{4 \times 4}} \cdot T_2 \cdot G_{s_{4 \times 4}}^2 \cdot H_{2_{4 \times 8}} \cdot F \cdot X_{8 \times 1}$$

The UE 804 can join $R_{1_{4 \times 1}}$ and $R_{2_{4 \times 1}}$ to obtain:

$$R_{8 \times 1} = \begin{bmatrix} R_{1_{4 \times 1}} \\ R_{2_{4 \times 1}} \end{bmatrix}$$

$$= \begin{bmatrix} H_{3_{4 \times 4}} \cdot T_1 \cdot G_{s_{4 \times 4}}^1 \cdot H_{1_{4 \times 8}} \cdot F \cdot X_{8 \times 1} \\ H_{4_{4 \times 4}} \cdot T_2 \cdot G_{s_{4 \times 4}}^2 \cdot H_{2_{4 \times 8}} \cdot F \cdot X_{8 \times 1} \end{bmatrix}$$

$$= \begin{bmatrix} H_{3_{4 \times 4}} \cdot T_1 \cdot G_{s_{4 \times 4}}^1 \cdot [H_{1_{4 \times 8}} \cdot F]_{4 \times 8} \\ H_{4_{4 \times 4}} \cdot T_2 \cdot G_{s_{4 \times 4}}^2 \cdot [H_{2_{4 \times 8}} \cdot F]_{4 \times 8} \end{bmatrix} \cdot X_{8 \times 1}$$

The matrix $$Q_{8 \times 8}^* = \begin{bmatrix} H_{3_{4 \times 4}} \cdot T_1 \cdot G_{s_{4 \times 4}}^1 \cdot [H_{1_{4 \times 8}} \cdot F]_{4 \times 8} \\ H_{4_{4 \times 4}} \cdot T_2 \cdot G_{s_{4 \times 4}}^2 \cdot [H_{2_{4 \times 8}} \cdot F]_{4 \times 8} \end{bmatrix}$$

has a rank 8.

Further, the CSI-RSs $X_{8 \times 1}$ is known to the UE 804. The UE 804 can measure the baseband signals extracted from the received RF signals to determine $R_{8 \times 1}$. As such, based on the equation $R_{8 \times 1} = Q_{8 \times 8}^* \cdot X_{8 \times 1}$, the UE 804 can estimate $Q_{8 \times 8}^*$. The UE 804 can conduct channel state measurements corresponding to the $X_{8 \times 1}$ based on the baseband signals. Further, in certain configurations, the UE 804 may transmit a capacity indicator to the base station 802. The capacity indicator indicating that the UE 804, with the assistance of the repeaters (e.g., the repeater 806 and the repeater 808), can receive data simultaneously from 8 antenna ports of the base station 802. Accordingly, the base station 802, as described supra, transmits CSI-RSs from the 8 antenna ports 862-1 to 862-8 to the UE 804. As such, the UE 804 can further determine, based on $R_{8,1}$, Channel Quality Indicator (CQI), a Precoding Matrix Index (PMI), a Rank Indicator (RI), and other CSI indicators corresponding to the 8 antenna ports 862-1 to 862-8 of the base station 802.

In general, using the techniques described supra, a CSI report can be associated with Y antenna ports (or reference signal ports) for a master MT equipped with X receiving antennas, where Y>X. A base station transmits reference signals corresponding to Y antenna ports in first frequency-time resources $(f,t)_1$. The MT receives reference signals corresponding to all of the Y antenna ports on frequency-time resources $(f,t)_{2,k}$, where at least one of $(f,t)_{2,k}$, $k=1,2,3, \ldots$, does not overlap with $(f,t)_1$.

The slave $M_k$ receives CSI-RSs received on $(f,t)_1$, amplifies the CSI-RSs, and forwards the CSI-RSs to the master MT on $(f,t)_{2,k}$. A CSI report is generated based on the CSI-RSs received at the master MT. The master MT combines CSI-RSs, received in $(f,t)_1$, $(f,t)_{2,1}$, $(f,t)_{2,2}$, . . . , corresponding to the Y antenna ports to derive the CSI report. The CSI report may be with a rank greater than the number of receive antenna at the master MT. The rank may be bounded by the sum of the receive antenna of all MTs.

The UE send a capability report to the base station. As such, the base station knows the master MT, or a MT group formed by the master MT and slave MTs, can support a rank Y, where Y can be greater than the number of receiving antennas at the master MT.

Figure 9:
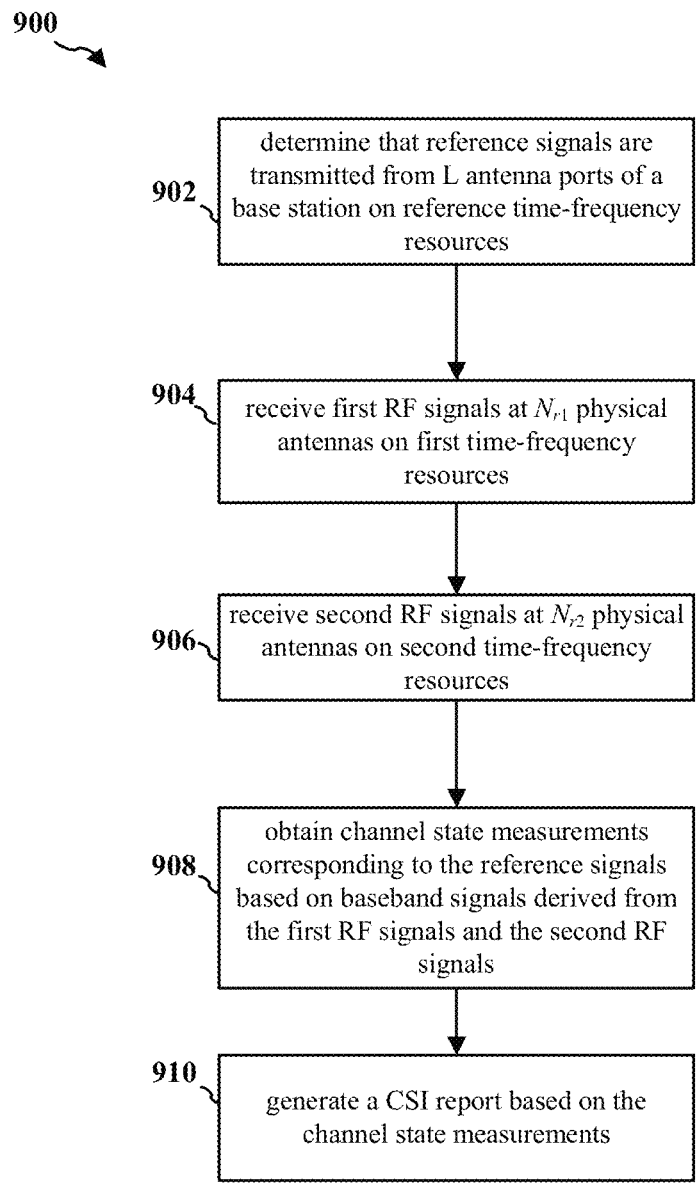
FIG. 9 is a flow chart of a method (process) for reporting CSI.

FIG. 9 is a flow chart 900 of a method (process) for reporting CSI. The method may be performed by a UE (e.g., the UE 804). At operation 902, the UE determines that reference signals are transmitted from L antenna ports of a base station on reference time-frequency resources. At operation 904, the UE receives first RF signals at $N_{r1}$ physical antennas on first time-frequency resources. The first RF signals carrying the reference signals. $N_{r1}$ and L are positive integers. $N_{r1}$ is less than L. At operation 906, the UE receives second RF signals at $N_{r2}$ physical antennas on second time-frequency resources. The second RF signals carries the reference signals. $N_{r2}$ is a positive integer and less than L.

At operation 908, the UE obtains channel state measurements corresponding to the reference signals based on baseband signals derived from the first RF signals and the second RF signals. The UE generates a CSI report based on the channel state measurements.

In certain configurations, the $N_{r1}$ physical antennas and the $N_{r2}$ physical antennas share at least one same physical antenna. In certain configurations, the first time-frequency resources are the same as the reference time-frequency resources. In certain configurations, the first RF signals and the second RF signals are received in a same time slot. In certain configurations, the first time-frequency resources do not overlap with the second time-frequency resources in a frequency domain.

In certain configurations, the first RF signals are received from the base station or a first repeater, wherein the second RF signals are received from a second repeater. In certain configurations, the first repeater and the second repeater receive RF signals on the reference time-frequency resources and forward the received signals on the first time-frequency resources and on the second time-frequency resources, respectively.

In certain configurations, the CSI report includes at least one of a Channel Quality Indicator (CQI), a Precoding Matrix Index (PMI), a Rank Indicator (RI) each generated with respect to the L antennas ports of the base station. In certain configurations, the CSI report includes the RI, wherein the RI indicates a rank larger than each of the $N_{r1}$ and the $N_{r2}$.

Figure 10:
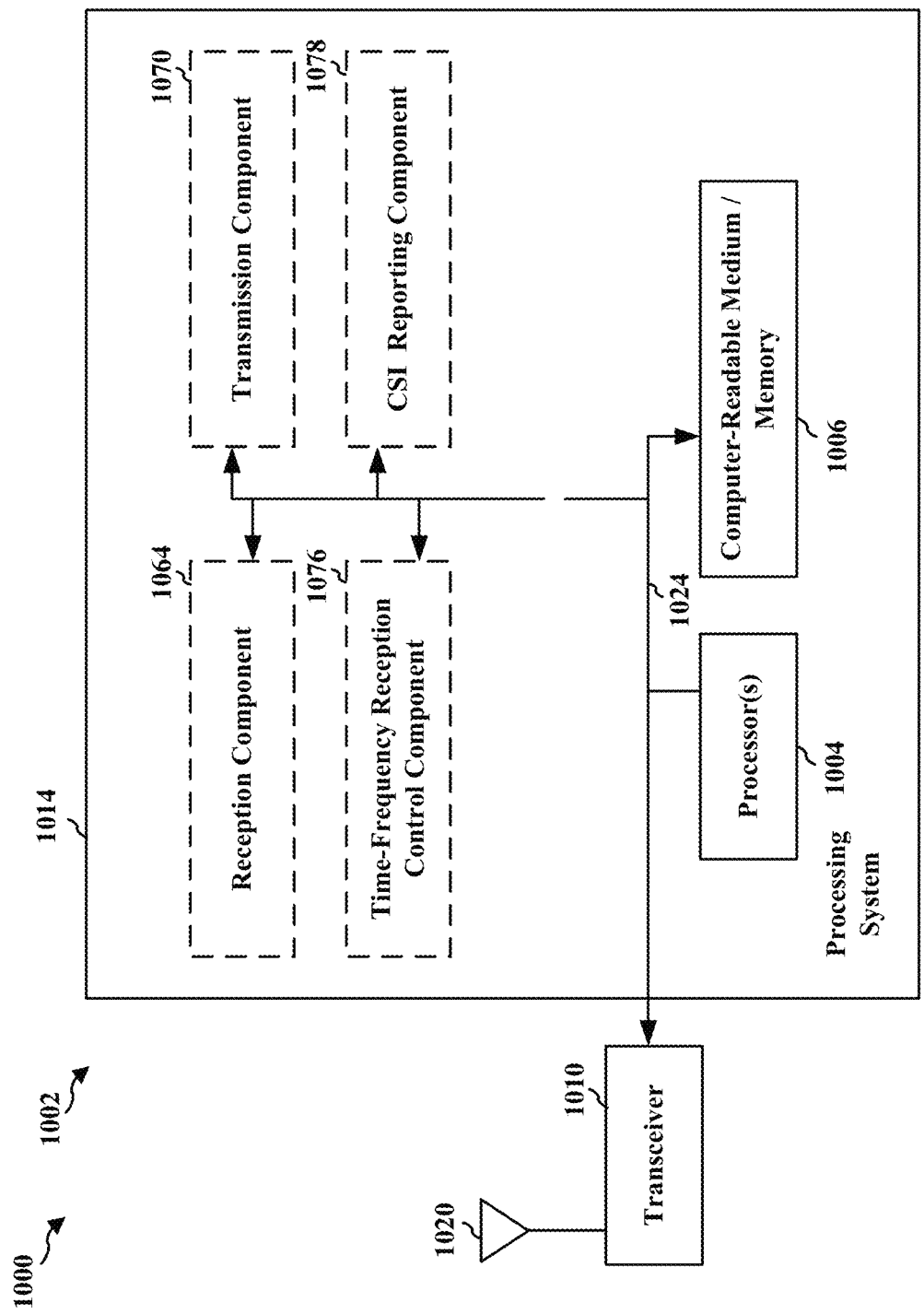
FIG. 10 is a diagram illustrating an example of a hardware implementation for an apparatus employing a processing system.

FIG. 10 is a diagram 1000 illustrating an example of a hardware implementation for an apparatus 1002 employing a processing system 1014. The apparatus 1002 may be a UE. The processing system 1014 may be implemented with a bus architecture, represented generally by a bus 1024. The bus 1024 may include any number of interconnecting buses and bridges depending on the specific application of the processing system 1014 and the overall design constraints. The bus 1024 links together various circuits including one or more processors and/or hardware components, represented by one or more processors 1004, a reception component 1064, a transmission component 1070, a time-frequency reception control component 1076, a CSI reporting component 1078, and a computer-readable medium/memory 1006. The bus 1024 may also link various other circuits such as timing sources, peripherals, voltage regulators, and power management circuits, etc.

The processing system 1014 may be coupled to a transceiver 1010, which may be one or more of the transceivers 354. The transceiver 1010 is coupled to one or more antennas 1020, which may be the communication antennas 352.

The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 1064. In addition, the transceiver 1010 receives information from the processing system 1014, specifically the transmission component 1070, and based on the received information, generates a signal to be applied to the one or more antennas 1020.

The processing system 1014 includes one or more processors 1004 coupled to a computer-readable medium/memory 1006. The one or more processors 1004 are responsible for general processing, including the execution of software stored on the computer-readable medium/memory 1006. The software, when executed by the one or more processors 1004, causes the processing system 1014 to perform the various functions described supra for any particular apparatus. The computer-readable medium/memory 1006 may also be used for storing data that is manipulated by the one or more processors 1004 when executing software. The processing system 1014 further includes at least one of the reception component 1064, the transmission component 1070, the time-frequency reception control component 1076, and the CSI reporting component 1078. The components may be software components running in the one or more processors 1004, resident/stored in the computer readable medium/memory 1006, one or more hardware components coupled to the one or more processors 1004, or some combination thereof. The processing system 1014 may be a component of the UE 350 and may include the memory 360 and/or at least one of the TX processor 368, the RX processor 356, and the communication processor 359.

In one configuration, the apparatus 1002/apparatus 1002' for wireless communication includes means for performing each of the operations of FIG. 9. The aforementioned means may be one or more of the aforementioned components of the apparatus 1002 and/or the processing system 1014 of the apparatus 1002 configured to perform the functions recited by the aforementioned means.

As described supra, the processing system 1014 may include the TX Processor 368, the RX Processor 356, and the communication processor 359. As such, in one configuration, the aforementioned means may be the TX Processor 368, the RX Processor 356, and the communication processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    determining that reference signals are transmitted from L antenna ports of a base station on reference time-frequency resources;
    receiving first radio frequency (RF) signals at $N_{r1}$ physical antennas on first time-frequency resources, the first RF signals carrying the reference signals, $N_{r1}$ and L being positive integers, $N_{r1}$ being less than L;
    receiving second RF signals at $N_{r2}$ physical antennas on second time-frequency resources, the second RF signals carrying the reference signals, $N_{r2}$ being a positive integer and less than L;
    obtaining channel state measurements corresponding to the reference signals based on baseband signals derived from the first RF signals and the second RF signals; and
    generating a channel state information (CSI) report based on the channel state measurements.

2. The method of claim 1, wherein the $N_{r1}$ physical antennas and the $N_{r2}$ physical antennas share at least one same physical antenna.

3. The method of claim 1, wherein the first time-frequency resources are the same as the reference time-frequency resources.

4. The method of claim 1, wherein the first RF signals and the second RF signals are received in a same time slot.

5. The method of claim 1, wherein the first time-frequency resources do not overlap with the second time-frequency resources in a frequency domain.

6. The method of claim 1, wherein the first RF signals are received from the base station or a first repeater, wherein the second RF signals are received from a second repeater.

7. The method of claim 6, wherein the first repeater and the second repeater receive RF signals on the reference time-frequency resources and forward the received signals on the first time-frequency resources and on the second time-frequency resources, respectively.

8. The method of claim 1, wherein the CSI report includes at least one of a Channel Quality Indicator (CQI), a Precoding Matrix Index (PMI), a Rank Indicator (RI) each generated with respect to the L antennas ports of the base station.

9. The method of claim 1, wherein the CSI report includes the RI, wherein the RI indicates a rank larger than each of the $N_{r1}$ and the $N_{r2}$.

10. An apparatus for wireless communication, the apparatus being a user equipment (UE), comprising:
    a memory; and
    at least one processor coupled to the memory and configured to:
        determine that reference signals are transmitted from L antenna ports of a base station on reference time-frequency resources;
        receive first radio frequency (RF) signals at $N_{r1}$ physical antennas on first time-frequency resources, the first RF signals carrying the reference signals, $N_{r1}$ and L being positive integers, $N_{r1}$ being less than L;
        receive second RF signals at $N_{r2}$ physical antennas on second time-frequency resources, the second RF signals carrying the reference signals, $N_{r2}$ being a positive integer and less than L;
        obtain channel state measurements corresponding to the reference signals based on baseband signals derived from the first RF signals and the second RF signals; and
        generate a channel state information (CSI) report based on the channel state measurements.

11. The apparatus of claim 10, wherein the $N_{r1}$ physical antennas and the $N_{r2}$ physical antennas share at least one same physical antenna.

12. The apparatus of claim 10, wherein the first time-frequency resources are the same as the reference time-frequency resources.

13. The apparatus of claim 10, wherein the first RF signals and the second RF signals are received in a same time slot.

14. The apparatus of claim 10, wherein the first time-frequency resources do not overlap with the second time-frequency resources in a frequency domain.

15. The apparatus of claim 10, wherein the first RF signals are received from the base station or a first repeater, wherein the second RF signals are received from a second repeater.

16. The apparatus of claim 15, wherein the first repeater and the second repeater receive RF signals on the reference time-frequency resources and forward the received signals on the first time-frequency resources and on the second time-frequency resources, respectively.

17. The apparatus of claim 10, wherein the CSI report includes at least one of a Channel Quality Indicator (CQI), a Precoding Matrix Index (PMI), a Rank Indicator (RI) each generated with respect to the L antennas ports of the base station.

18. The apparatus of claim 10, wherein the CSI report includes the RI, wherein the RI indicates a rank larger than each of the $N_{r1}$ and the $N_{r2}$.

19. A computer-readable medium storing computer executable code for wireless communication of a user equipment (UE), comprising code to:
    determine that reference signals are transmitted from L antenna ports of a base station on reference time-frequency resources;
    receive first radio frequency (RF) signals at $N_{r1}$ physical antennas on first time-frequency resources, the first RF signals carrying the reference signals, $N_{r1}$ and L being positive integers, $N_{r1}$ being less than L;
    receive second RF signals at $N_{r2}$ physical antennas on second time-frequency resources, the second RF signals carrying the reference signals, $N_{r2}$ being a positive integer and less than L;
    obtain channel state measurements corresponding to the reference signals based on baseband signals derived from the first RF signals and the second RF signals; and
    generate a channel state information (CSI) report based on the channel state measurements.

20. The computer-readable medium of claim 19, wherein the $N_{r1}$ physical antennas and the $N_{r2}$ physical antennas share at least one same physical antenna.

* * * * *